US012598056B2

(12) United States Patent
Kyuhata et al.

(10) Patent No.: US 12,598,056 B2
(45) Date of Patent: Apr. 7, 2026

(54) COMMUNICATION SYSTEM, MASTER DEVICE, SLAVE DEVICE, AND CONTROL METHOD FOR COMMUNICATION SYSTEM

(71) Applicant: Panasonic Intellectual Property Management Co., Ltd., Osaka (JP)

(72) Inventors: Atsuki Kyuhata, Osaka (JP); Hayata Sakai, Osaka (JP); Masashi Mishima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 18/551,888

(22) PCT Filed: Feb. 15, 2022

(86) PCT No.: PCT/JP2022/005980
§ 371 (c)(1),
(2) Date: Sep. 22, 2023

(87) PCT Pub. No.: WO2022/215359
PCT Pub. Date: Oct. 13, 2022

(65) Prior Publication Data
US 2024/0223351 A1     Jul. 4, 2024

(30) Foreign Application Priority Data
Apr. 9, 2021    (JP) ................................. 2021-066619

(51) Int. Cl.
*H04L 7/02*         (2006.01)
(52) U.S. Cl.
CPC ...................................... *H04L 7/02* (2013.01)
(58) Field of Classification Search
CPC ........................................................ H04L 7/02
See application file for complete search history.

(56) References Cited

U.S. PATENT DOCUMENTS 5,913,053 A * 6/1999 Nonogaki .......... G05B 19/0421
                                             713/400
2003/0065963 A1    4/2003   Gregg
2012/0224492 A1    9/2012   Kitayama et al.

FOREIGN PATENT DOCUMENTS

JP        05-134062        5/1993
JP        5377663 B      12/2013

OTHER PUBLICATIONS

International Search Report of PCT application No. PCT/JP2022/005980 dated May 17, 2022.

* cited by examiner

*Primary Examiner* — Duc C Ho
(74) *Attorney, Agent, or Firm* — Rimon P.C.

(57) ABSTRACT

A bandwidth used in a network of a communication system is suppressed. Communication system includes master device and slave device. Master device includes: first counter that increments a first count value every time a first unit time elapses; second counter that updates a second count value every time a second unit time elapses; and master transmitter that transmits timing information indicating a timing at which the second count value is updated to slave device. Slave device includes: third counter that increments a third count value every time the first unit time elapses; fourth counter that increments a fourth count value every time a third unit time shorter than the first unit time lapses, and resets the fourth count value at a timing of incrementing the third count value; and slave receiver that receives the timing information from master transmitter.

9 Claims, 9 Drawing Sheets

FIG. 1

TRANSMIT TIME STAMP COMMAND

RECEIVE TIME STAMP COMMAND

1

COMMUNICATION SYSTEM, MASTER DEVICE, SLAVE DEVICE, AND CONTROL METHOD FOR COMMUNICATION SYSTEM

CROSS-REFERENCE TO RELATED APPLICATIONS

This application is a U.S. national stage application of the PCT International Application No. PCT/JP2022/005980 filed on Feb. 15, 2022, which claims the benefit of foreign priority of Japanese patent application No. 2021-066619 filed on Apr. 9, 2021, the contents all of which are incorporated herein by reference.

TECHNICAL FIELD

The present disclosure relates to a communication system, a master device, a slave device, and a control method for a communication system.

BACKGROUND ART

Conventionally, a communication system including a master device and a slave device is known. For example, PTL 1 discloses a communication system including a time master node that is an example of a master device and a time slave node that is an example of a slave device.

CITATION LIST

Patent Literature

PTL 1: Japanese Patent No. 5377663

SUMMARY OF THE INVENTION

However, in the communication system of PTL 1, since time information of a master node having a large amount of information is periodically transmitted and received, there is a problem that the bandwidth used in a network is large.

The present disclosure has been made to solve such a problem, and an object thereof is to provide a communication system and the like capable of curbing increase in bandwidth used in a network.

A communication system according to one aspect of the present disclosure includes a master device and one or more slave devices that communicate with the master device. The master device includes a first counter that increments a first count value every time a first unit time elapses, a second counter that updates a second count value every time a second unit time elapses, and a master transmitter that transmits timing information indicating a timing at which the second count value is updated to each of the one or more slave devices. Each of the one or more slave devices includes a third counter that increments a third count value every time the first unit time elapses, and a fourth counter that increments a fourth count value every time a third unit time shorter than the first unit time elapses, and resets the fourth count value at a timing at which the third counter increments the third count value, and a slave receiver that receives the timing information transmitted from the master transmitter.

A master device according to another aspect of the present disclosure includes: a first counter that increments a first count value every time a first unit time elapses; a second counter that updates a second count value every time a second unit time elapses; and a master transmitter that transmits timing information indicating a timing at which the second count value is updated to each of one or more slave devices that communicate with the master device.

A slave device according to still another aspect of the present disclosure communicates with a master device. The master device includes a first counter that increments a first count value every time a first unit time elapses, a second counter that updates a second count value every time a second unit time elapses, and a master transmitter that transmits timing information indicating a timing at which the second count value is updated to the slave device. The slave device includes: a third counter that increments a third count value every time the first unit time elapses; a fourth counter that increments a fourth count value every time a third unit time shorter than the first unit time elapses, and resets the fourth count value at a timing at which the third counter increments the third count value; and a slave receiver that receives the timing information transmitted from the master transmitter.

A control method for a communication system according to still another aspect of the present disclosure is a control method for a communication system including a master device and one or more slave devices that communicate with the master device. The master device increments a first count value every time a first unit time elapses, updates a second count value every time a second unit time elapses, and transmits timing information indicating a timing at which the second count value is updated to each of the one or more slave devices. Each of the one or more slave devices increments a third count value every time the first unit time elapses, increments a fourth count value every time a third unit time shorter than the first unit time elapses, and resets the fourth count value at a timing of incrementing the third count value, and receives the timing information transmitted from the master device.

According to the present disclosure, it is possible to provide a communication system and the like capable of curbing increase in a bandwidth used in a network.

BRIEF DESCRIPTION OF THE DRAWINGS

FIG. 1 is a block diagram illustrating a functional configuration of a communication system according to a first exemplary embodiment.

DESCRIPTION OF EMBODIMENT

Hereinafter, an exemplary embodiment of the present disclosure will be described. Note that the exemplary embodiment described below illustrates one specific example of the present disclosure. Therefore, numerical values, constituent elements, disposition positions, and connection modes of the constituent elements, and steps, order of the steps, and the like shown in the following exemplary embodiment are merely examples, and are not intended to limit the present disclosure. Among the constituent elements in the following exemplary embodiments, constituent elements that are not described in independent claims indicating the highest concept of the present disclosure will be described as optional constituent elements.

Each of the drawings is a schematic view, and is not necessarily precisely illustrated. Note that, in each drawing, substantially identical components are denoted by identical reference signs and repetitive explanations thereof will be omitted or simplified.

First Exemplary Embodiment

Figure 1:
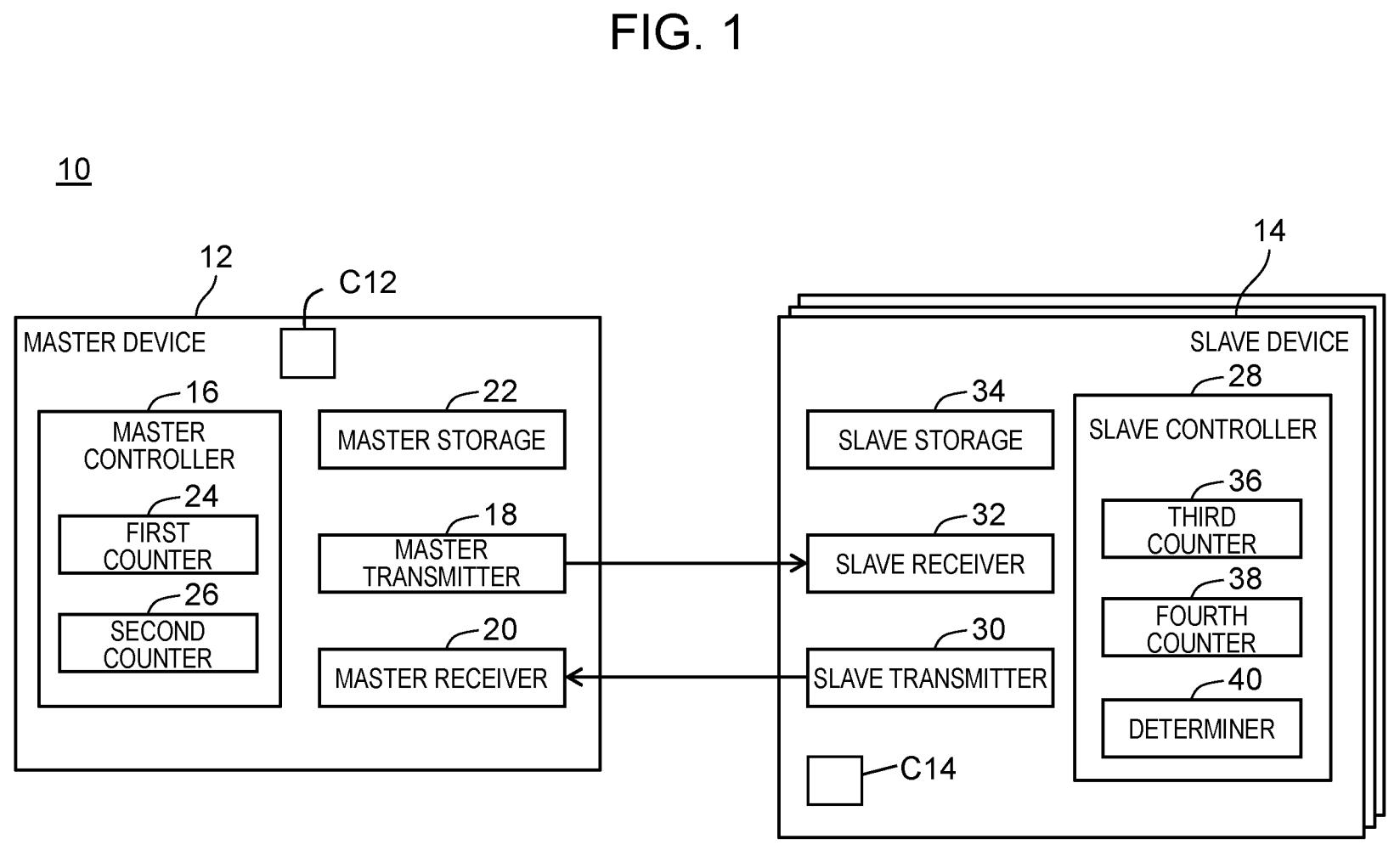
Figure 2:
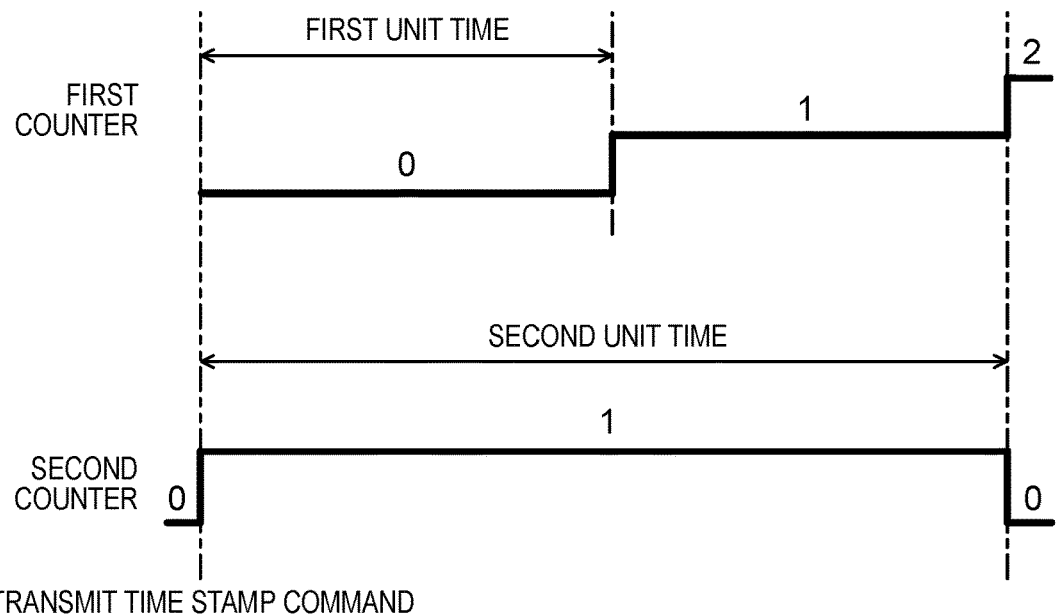
FIG. 2 is a diagram for explaining incrementation by a first counter and a second counter of a master device of the communication system in FIG. 1.
Figure 3:
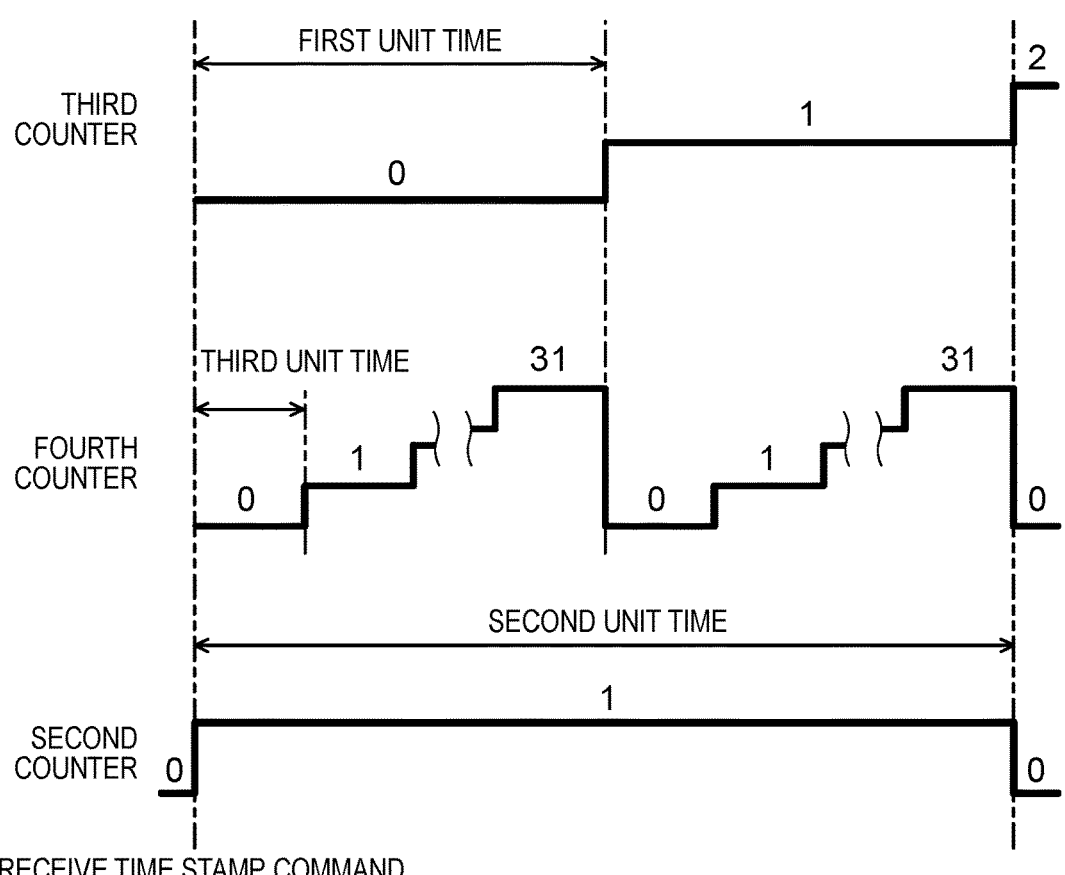
FIG. 3 is a diagram for explaining incrementation by a third counter and a fourth counter of a slave device of the communication system in FIG. 1.

FIG. 1 is a block diagram illustrating a functional configuration of communication system 10 according to a first exemplary embodiment. FIG. 2 is a diagram for explaining incrementation by first counter 24 and second counter 26 of master device 12 of communication system 10 in FIG. 1. FIG. 3 is a diagram for explaining incrementation by third counter 36 and fourth counter 38 of slave device 14 of communication system 10 in FIG. 1. Communication system 10 will be described with reference to FIGS. 1 to 3.

As illustrated in FIG. 1, communication system 10 includes master device 12 and a plurality of slave devices 14 that communicate with master device 12, and performs communication by a master-slave method. For example, master device 12 and the plurality of slave devices 14 constitute an industrial network, and each of master devices 12 and the plurality of slave devices 14 is an industrial device. For example, the network topology in the industrial network is a ring type or a line type. Note that communication system 10 may include one slave device 14 instead of a plurality of slave devices.

Master device 12 is a communication device (for example, an industrial device) that functions as a master in master-slave communication. Master device 12 can perform wired communication with each of the plurality of slave devices 14 via a communication line. Master device 12 includes master controller 16, master transmitter 18, master receiver 20, and master storage 22. Master device 12 may be configured to wirelessly communicate with each of the plurality of slave devices 14.

Master controller 16 is a controller that performs information processing and the like for controlling master device 12. For example, master controller 16 is realized by a microcomputer, a processor, or the like. Furthermore, for example, the function of master controller 16 is realized by a microcomputer, a processor, or the like constituting master controller 16 executing a computer program stored in master storage 22. Master controller 16 includes first counter 24 and second counter 26.

As illustrated in FIG. 2, first counter 24 is a counter that increments a first count value every time the first unit time elapses. For example, the first unit time is preset and is 1 millisecond. For example, first counter 24 increments the first count value every time the first unit time elapses based on internal clock C12 built into master device 12. For example, the first count value indicates time in communication system 10. For example, first counter 24 may also be referred to as a minimum time measurement counter. For example, first counter 24 is realized by a circuit (hereinafter simply referred to as a circuit) or the like on which an electronic element or the like is mounted.

Second counter 26 is a counter that updates the second count value every time the second unit time elapses. For example, the second unit time is preset and is 2 milliseconds. For example, second counter 26 updates the second count value every time the second unit time elapses based on internal clock C12 built into master device 12. That is, second counter 26 updates the second count value every time the second unit time elapses based on same internal clock C12 as that of first counter 24. For example, second counter 26 may also be referred to as a timing (TMG) counter. For example, second counter 26 is realized by a circuit or the like.

In this exemplary embodiment, the second unit time is longer than the first unit time and is an integer multiple of the first unit time. Specifically, in this exemplary embodiment, the second unit time is twice the first unit time. For example, the second unit time may be three times or four times the first unit time. For example, the second unit time may not be an integer multiple of the first unit time. Although details will be described later, in the present exemplary embodiment, the second unit time is an integer multiple of the third unit time.

For example, first counter 24 starts incrementing the first count value from the time at which master transmitter 18 transmits the time stamp command to the plurality of slave devices 14, and second counter 26 starts updating the second count value from the time. As a result, in this exemplary embodiment, the first count value is incremented by first counter 24 at the time at which the second count value is updated by second counter 26. That is, the time at which the second count value is updated by the second counter 26 is also the time at which the first count value is incremented by first counter 24.

As illustrated in FIG. 1, master transmitter 18 is a transmitter for transmitting various types of information from master device 12 to each of the plurality of slave devices 14. For example, master transmitter 18 is realized by a communication circuit or the like. Specifically, for example, master transmitter 18 is realized by a wired communication circuit or the like corresponding to a communication standard such as a wired local area network (LAN). When master device 12 is configured to wirelessly communicate with each of the plurality of slave devices 14, master transmitter 18 is realized by a wireless communication circuit or the like corresponding to a communication standard such as a wireless local area network (LAN).

Master transmitter 18 transmits timing information indicating the timing at which the second count value is updated to each of the plurality of slave devices 14. For example, the timing information includes time series data of the second count value. For example, master transmitter 18 transmits the timing information to each of the plurality of slave devices 14 by periodically transmitting the second count value to each of the plurality of slave devices 14. In this case, for example, it is indicated that in the time series data of the second count value, the timing at which the second count value is switched is the timing at which the second count value is updated. Note that, for example, the timing information may include update information indicating that the second count value has been updated. For example, master transmitter 18 may transmit the timing information to each of the plurality of slave devices 14 by transmitting the update information to each of the plurality of slave devices 14 every time the second count value is updated. In this case, for example, it is indicated that the timing at which the update information is transmitted is the timing at which the second count value is updated.

In addition, master transmitter 18 transmits the first count value to slave device 14 that is the transmission source of the transmission request received by master receiver 20 among the plurality of slave devices 14. The transmission request is a transmission request of the first count value.

Master receiver 20 is a receiver for master device 12 to receive various types of information from each of the plurality of slave devices 14. For example, master receiver 20 receives the transmission request transmitted from slave transmitter 30 of each of the plurality of slave devices 14. For example, master receiver 20 is realized by a communication circuit or the like. Specifically, for example, master receiver 20 is realized by a wired communication circuit or the like corresponding to a communication standard such as a wired local area network (LAN). The wired LAN is, for example, Ethernet (registered trademark).

Master storage 22 is a storage device that stores information necessary for the information processing, the computer program, and the like. For example, master storage 22 is realized by a semiconductor memory or the like.

Each of the plurality of slave devices 14 is a communication device (for example, an industrial device) that functions as a slave in master-slave communication. Each of the plurality of slave devices 14 can perform wired communication with master device 12. Each of the plurality of slave devices 14 includes slave controller 28, slave transmitter 30, slave receiver 32, and slave storage 34.

Slave controller 28 is a controller that performs information processing and the like for controlling slave device 14. For example, slave controller 28 is realized by a microcomputer, a processor, or the like. Furthermore, for example, the function of slave controller 28 is realized by a microcomputer, a processor, or the like constituting slave controller 28 executing a computer program stored in slave storage 34. Slave controller 28 includes third counter 36, fourth counter 38, and determiner 40.

As illustrated in FIG. 3, third counter 36 is a counter that increments a third count value every time the first unit time elapses. That is, third counter 36 increments the third count value every time the same unit time as the unit time in which first counter 24 increments the first count value elapses. For example, third counter 36 increments the third count value every time the first unit time elapses based on internal clock C14 built into slave device 14. Note that, since an error may occur between the frequency of internal clock C12 of master device 12 and the frequency of internal clock C14 of slave device 14, a difference may occur between the actual incrementation cycle of the first count value and the actual incrementation cycle of the third count value. For example, the third count value indicates time in communication system 10. For example, third counter 36 may also be referred to as a minimum time measurement counter. For example, third counter 36 is realized by a circuit or the like.

Fourth counter 38 is a counter that increments a fourth count value every time the third unit time shorter than the first unit time elapses, and resets a fourth count value at a timing when third counter 36 increments the third count value. That is, fourth counter 38 resets the fourth count value at the time at which third counter 36 increments the third count value. For example, the third unit time is preset and is 31.25 microseconds. For example, fourth counter 38 increments the fourth count value every time the third unit time elapses based on internal clock C14 built into slave device 14. That is, fourth counter 38 increments the fourth count value every time the third unit time elapses based on same internal clock C14 as third counter 36. For example, fourth counter 38 may also be referred to as an internal time measurement counter. For example, fourth counter 38 is realized by a circuit or the like.

Since slave device 14 includes fourth counter 38 that increments the fourth count value every time the third unit time shorter than the first unit time elapses, slave device 14 can acquire time information finer than time information (time information exchanged on the network) based on the first count value exchanged between master device 12 and slave device 14. That is, since slave device 14 includes fourth counter 38, the time resolution of the time information included in slave device 14 can be improved without increasing the amount of communication data exchanged between master device 12 and slave device 14.

In this exemplary embodiment, the third unit time is 1/integer times the first unit time. Specifically, in this exemplary embodiment, the third unit time is ⅓₂ times the first unit time. For example, the third unit time may be ½ times or ⅓ times the first unit time. For example, the third unit time may not be 1/integer times the first unit time.

As described above, in this exemplary embodiment, the second unit time is an integer multiple of the third unit time. Specifically, in this exemplary embodiment, the second unit time is 64 times the third unit time. For example, the second unit time may be one or two times the third unit time. For example, the second unit time may not be an integer multiple of the second unit time.

For example, third counter 36 starts incrementing the third count value from the time at which slave receiver 32 receives the time stamp command transmitted from master device 12, and fourth counter 38 starts incrementing the fourth count value from the time. Furthermore, for example, the second count value of second counter 26 is periodically transmitted from master device 12 to each of the plurality of slave devices 14, and is updated based on internal clock C12 of master device 12.

Determiner 40 determines whether or not at least one of the number of incrementation times of the third count value and the number of incrementation times of the fourth count value within the update cycle of the second count value is normal based on the timing information received by slave receiver 32. For example, the update cycle of the second count value is a period from a timing at which the second count value is updated last time to a timing at which the second count value is updated this time. That is, the update cycle of the second count value is a period based on internal clock C12 of master device 12. For example, determiner 40 specifies the timing at which the second count value is updated last time and the timing at which the second count value is updated this time based on the timing information, and determines whether or not at least one of the number of incrementation times of the third count value and the number of incrementation times of the fourth count value in the period from the timing at which the second count value is updated last time to the timing at which the second count value is updated this time is normal.

As illustrated in FIG. 1, slave transmitter 30 is a transmitter for transmitting various types of information from slave device 14 to master device 12. For example, slave transmitter 30 is realized by a communication circuit or the like. Specifically, for example, slave transmitter 30 is realized by a wired communication circuit or the like corresponding to a communication standard such as a wired local area network (LAN).

When determiner 40 determines that at least one of the number of incrementation times of the third count value and the number of incrementation times of the fourth count value within the update cycle of the second count value is not normal, slave transmitter 30 transmits a transmission request for the first count value to master device 12.

Slave receiver 32 is a receiver for slave device 14 to receive various types of information from master device 12. For example, slave receiver 32 receives the timing information transmitted from master transmitter 18. For example, slave receiver 32 is realized by a communication circuit or the like. Specifically, for example, slave receiver 32 is realized by a wired communication circuit or the like corresponding to a communication standard such as a wired local area network (LAN).

Slave storage 34 is a storage device that stores information necessary for the information processing, the computer program, and the like. For example, slave storage 34 is realized by a semiconductor memory or the like.

Figure 4:
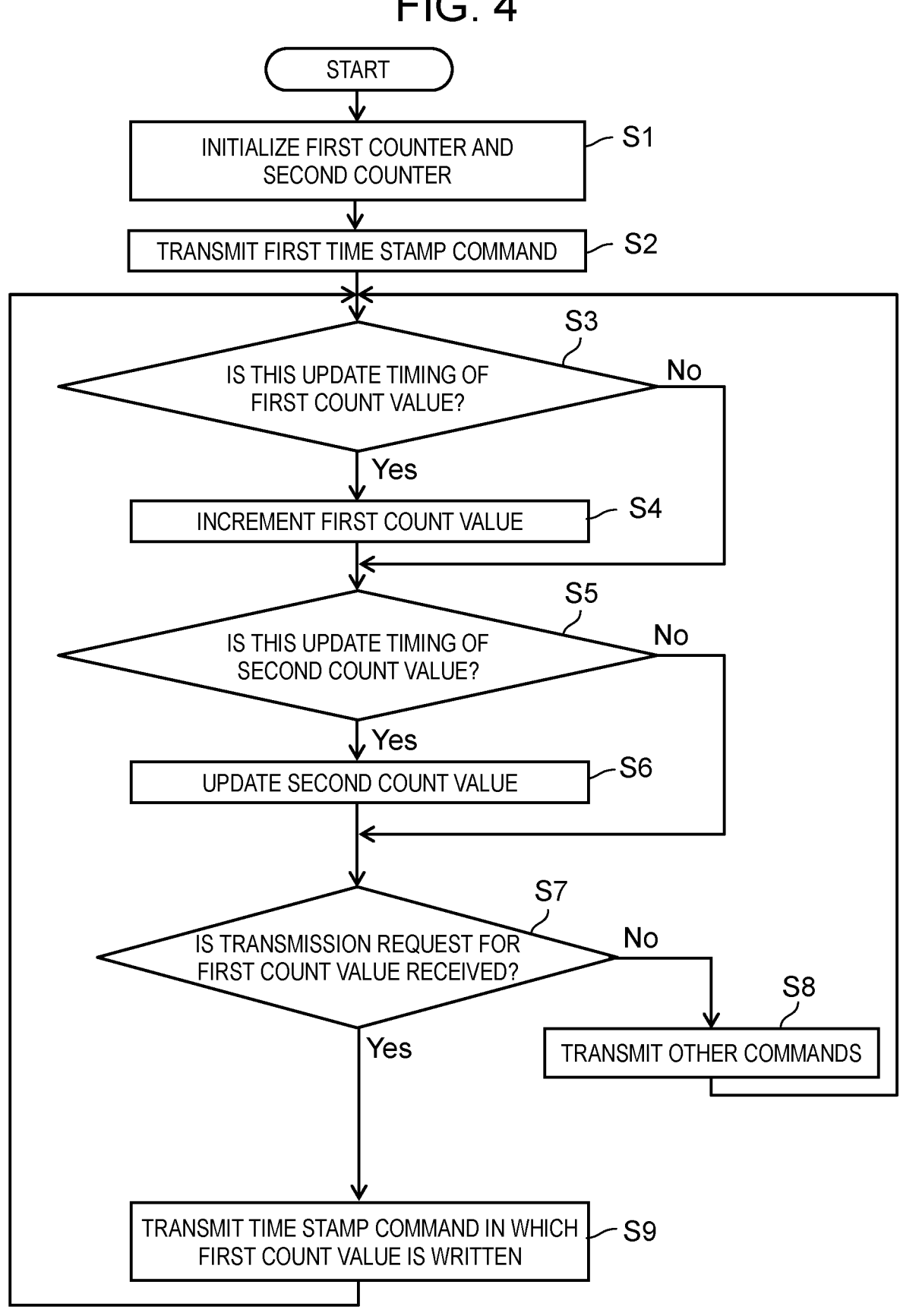
FIG. 4 is a flowchart illustrating an example of an operation of a master device of the communication system in FIG. 1.

FIG. 4 is a flowchart illustrating an example of an operation of master device 12 of communication system 10 in FIG. 1. An example of the operation of master device 12 of communication system 10 will be described with reference to FIG. 4.

As illustrated in FIG. 4, when wired communication with slave device 14 is established, master device 12 initializes first counter 24 and second counter 26 (step S1). For example, master device 12 initializes first counter 24 by setting the first count value to 0, and initializes second counter 26 by setting the second count value to 0.

Upon initializing first counter 24 and second counter 26, master device 12 transmits a first time stamp command (step S2). For example, the time stamp command is a command in which the first count value is written, and master device 12 transmits the command in which the first count value is written. Here, the first count value is 0. Furthermore, for example, master device 12 also writes the second count value in the first time stamp command. Here, the second count value is 1. That is, the second count value of second counter 26 is updated from 0 to 1 at the timing of transmitting the first time stamp command.

When transmitting the first time stamp command, master device 12 determines whether or not the timing is an update timing to update the first count value (step S3).

For example, master device 12 starts incrementing the first count value from the time at which the first time stamp command is transmitted, and determines that the timing is an update timing of the first count value when the first unit time has elapsed from the time at which the first time stamp command is transmitted. Furthermore, for example, when the first count value has been updated, master device 12 determines that the timing is an update timing of the first count value when the first unit time has elapsed from the time at which the first count value was updated immediately before.

On the other hand, for example, when the first unit time has not elapsed from the time at which the first time stamp command is transmitted, master device 12 determines that the timing is not an update timing of the first count value. Furthermore, for example, when the first count value has been updated, master device 12 determines that the timing is not an update timing of the first count value when the first unit time has not elapsed from the time at which the first count value was updated immediately before.

When the timing is an update timing of the first count value (Yes in step S3), master device 12 increments the first count value (step S4).

When the timing is not an update timing of the first count value (No in step S3) and when the first count value has been incremented (step S4), master device 12 determines whether or not the timing is an update timing of the second count value (step S5).

For example, master device 12 starts updating the second count value from the time at which the first time stamp command is transmitted, and determines that the timing is an update timing of the second count value when the second unit time has elapsed from the time at which the first time stamp command is transmitted. Furthermore, for example, when the second count value has been updated, master device 12 determines that the timing is an update timing of the second count value when the second unit time has elapsed from the time at which the second count value was updated immediately before.

On the other hand, for example, when the second unit time has not elapsed from the time at which the first time stamp command is transmitted, master device 12 determines that the timing is not an update timing of the second count value. Furthermore, for example, when the second count value has been updated, master device 12 determines that the timing is not an update timing of the second count value when the second unit time has not elapsed from the time at which the second count value was updated immediately before.

When the timing is an update timing of the second count value (Yes in step S5), master device 12 updates the second count value (step S6). For example, master device 12 updates the second count value from 0 to 1 when the second count value is 0, and updates the second count value from 1 to 0 when the second count value is 1.

When the timing is not an update timing of the second count value (No in step S5) and when the second count value has been updated (step S6), master device 12 determines whether or not a transmission request for the first count value has been received (step S7). Specifically, for example, master device 12 determines whether or not the transmission request is received from the plurality of slave devices 14.

When the transmission request of the first count value is not received (No in step S7), master device 12 transmits other commands to each of the plurality of slave devices 14 (step S8), and determines again whether or not the timing is an update timing of the first count value (step S3). For example, master device 12 transmits a command in which the second count value is written.

When the transmission request of the first count value is received (Yes in step S7), master device 12 transmits a time stamp command in which the first count value is written (step S9), and determines again whether or not the timing is an update timing of the first count value (step S3). For example, master device 12 transmits the first count value to slave device 14 that is the transmission source of the received transmission request among the plurality of slave devices 14, that is, slave device 14 that has transmitted the transmission request.

Figure 5:
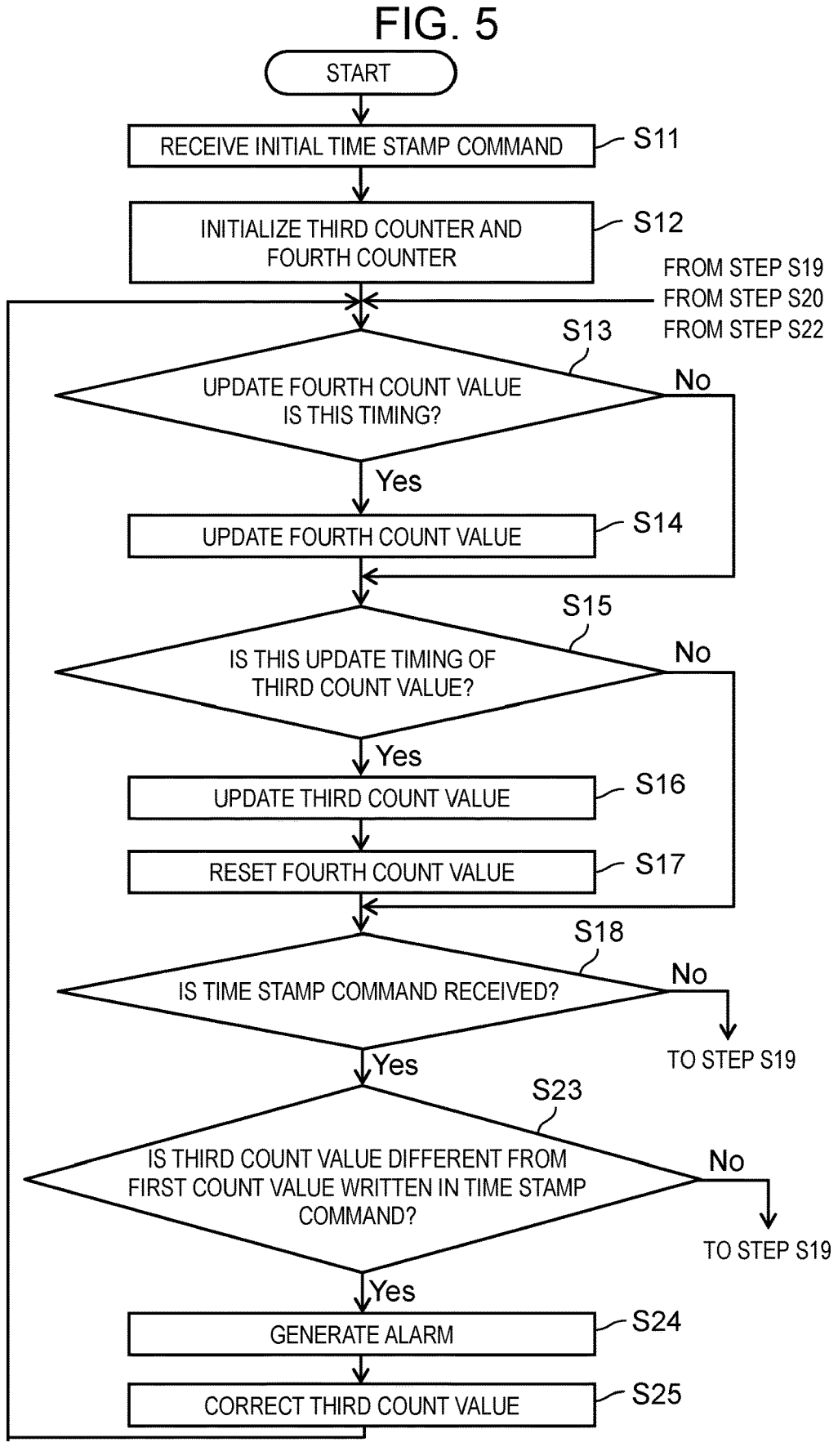
FIG. 5 is a flowchart illustrating an example of an operation of a slave device of the communication system in FIG. 1.
Figure 6:
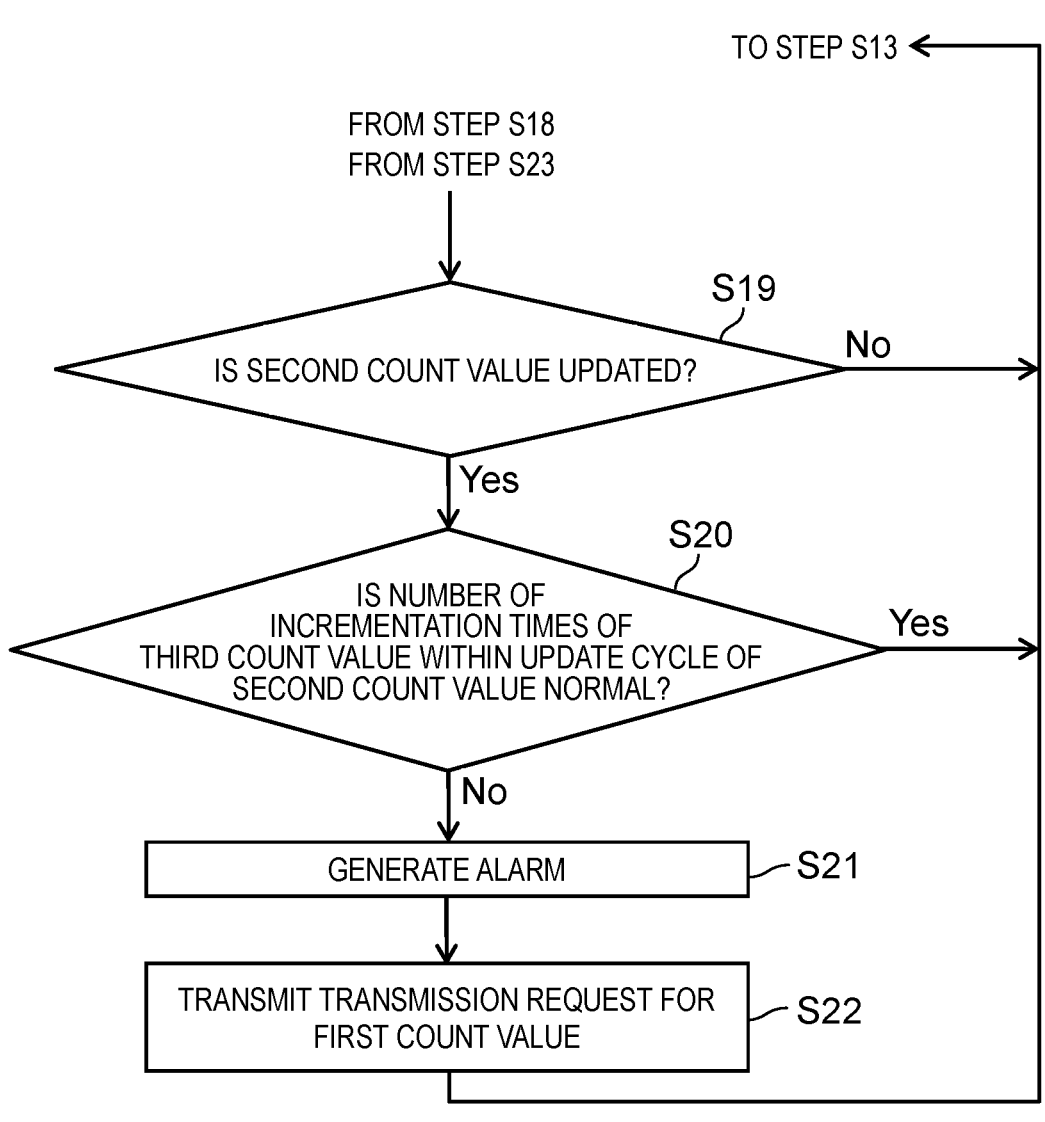
FIG. 6 is a flowchart illustrating an example of an operation of a slave device of the communication system in FIG. 1.
Figure 7:
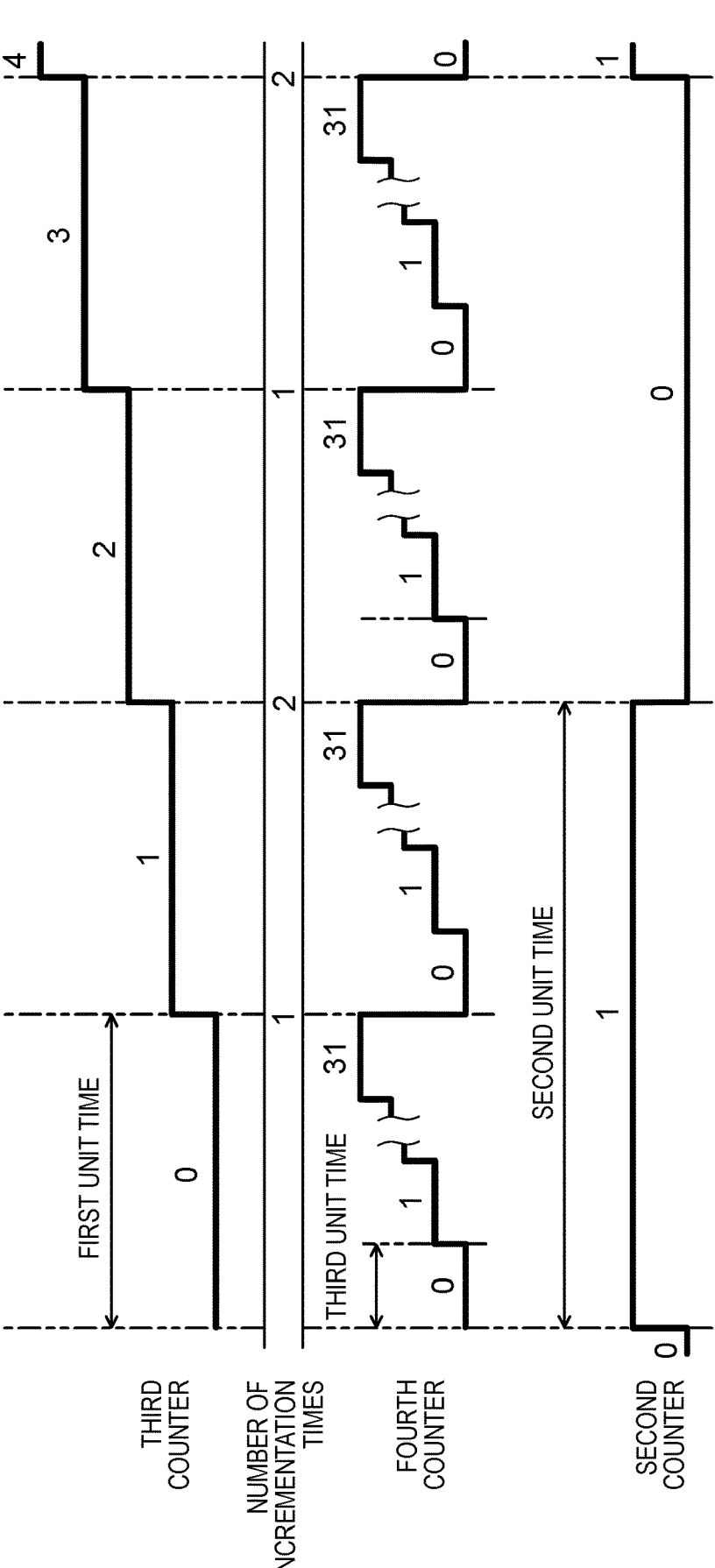
FIG. 7 is a diagram for explaining an example of an operation of the slave device of the communication system in FIG. 1.
Figure 8:
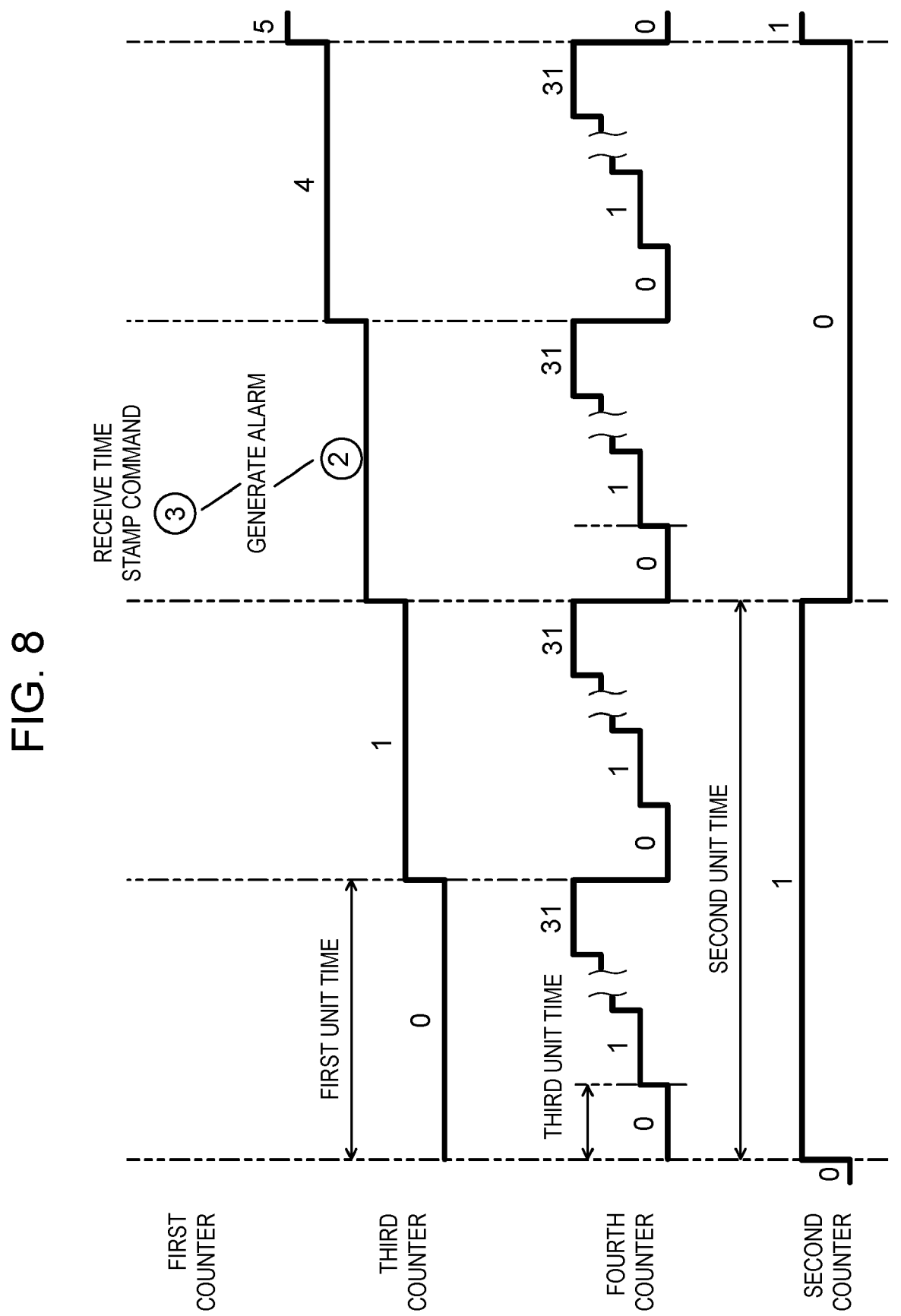
FIG. 8 is a diagram for explaining an example of an operation of the slave device of the communication system in FIG. 1.

FIG. 5 and FIG. 6 are flowcharts illustrating an example of an operation of slave device 14 of communication system 10 in FIG. 1. FIG. 7 and FIG. 8 are views for explaining an example of an operation of slave device 14 of communication system 10 in FIG. 1. An example of the operation of slave device 14 of communication system 10 will be described with reference to FIGS. 5 to 8. Note that, in the following description, an example of the operation of one slave device 14 among the plurality of slave devices 14 will be described, but since the other slave devices 14 also perform similar operations, details of the description of the example of the operation of the other slave device 14 will be omitted.

As illustrated in FIG. 5, when wired communication with master device 12 is established, slave device 14 receives a first time stamp command (step S11). For example, slave device 14 receives a command in which the first count value and the second count value are written. Here, the first count value is 0, and the second count value is 1.

Upon receiving the first time stamp command, slave device 14 initializes third counter 36 and fourth counter 38 (step S12). For example, slave device 14 initializes third counter 36 by setting the third count value to 0, and initializes fourth counter 38 by setting the fourth count value to 0.

After initializing third counter 36 and fourth counter 38, slave device 14 determines whether or not the timing is an update timing to update the fourth count value (step S13).

For example, slave device 14 starts incrementing the fourth count value from the time at which the first time stamp command is received, and determines that the timing is an update timing of the fourth count value when the third unit time has elapsed from the time at which the first time stamp command is received. Furthermore, for example, when the fourth count value has been updated, slave device 14 determines that the timing is an update timing of the fourth count value when the third unit time has elapsed from the time at which the fourth count value was updated immediately before.

On the other hand, for example, when the third unit time has not elapsed from the time at which the first time stamp command is received, slave device 14 determines that the timing is not an update timing of the fourth count value. Furthermore, for example, when the fourth count value has been updated, slave device 14 determines that the timing is not an update timing of the fourth count value when the third unit time has not elapsed from the time at which the fourth count value was updated immediately before.

When the timing is an update timing of the fourth count value (Yes in step S13), slave device 14 updates the fourth count value (step S14). Here, the fourth count value is incremented.

When the timing is not an update timing of the fourth count value (No in step S13) and when the fourth count value has been incremented (step S14), slave device 14 determines whether or not the timing is an update timing of the third count value (step S15).

For example, slave device 14 starts incrementing the third count value from the time at which the first time stamp command is received, and determines that the timing is an update timing of the third count value when the first unit time has elapsed from the time at which the first time stamp command is received. Furthermore, for example, when the third count value has been updated, slave device 14 determines that the timing is an update timing of the third count value when the first unit time has elapsed from the time at which the third count value was updated immediately before.

On the other hand, for example, when the first unit time has not elapsed from the time at which the first time stamp command is received, slave device 14 determines that the timing is not an update timing of the third count value. Furthermore, for example, when the third count value has been updated, slave device 14 determines that the timing is not an update timing of the third count value when the first unit time has not elapsed from the time at which the third count value was updated immediately before.

When the timing is an update timing of the third count value (Yes in step S15), slave device 14 updates the third count value (step S16), and resets the fourth count value (step S17). For example, slave device 14 increments the third count value from 0 to 1, and resets the fourth count value to 0.

When the timing is not an update timing of the third count value (No in step S15) and when the fourth count value is reset (step S17), slave device 14 determines whether a time stamp command has been received (step S18). For example, slave device 14 periodically receives a command from master device 12, determines that the time stamp command has been received when the command received from master device 12 is a time stamp command, and determines that the time stamp command has not been received when the command received from master device 12 is not a time stamp command. Here, the time stamp command is a command in which the first count value is written.

When the time stamp command has not been received (No in step S18), slave device 14 determines whether or not the second count value has been updated (step S19). As described above, for example, slave device 14 receives the timing information from master device 12, and determines whether or not the second count value has been updated based on the timing information.

For example, slave device 14 periodically receives a command from master device 12, and the second count value is written in the command. That is, for example, slave device 14 periodically receives the second count value. When the second count value received this time has not been updated from the second count value received last time, slave device 14 determines that the second count value has not been updated. Meanwhile, when the second count value received this time has been updated from the second count value received last time, slave device 14 determines that the second count value has been updated.

When the second count value has not been updated (No in step S19), slave device 14 determines again whether or not the timing is an update timing of the fourth count value (step S13).

When the second count value is updated (Yes in step S19), slave device 14 determines whether or not the number of incrementation times of the third count value within the update cycle of the second count value is normal (step S20). For example, slave device 14 sets the time from the timing at which the second count value is updated last time to the timing at which the second count value is updated this time as the update cycle of the second count value. Then, slave device 14 determines that the number of incrementation times of the third count value within the update cycle is normal when the number of incrementation times of the third count value within the update cycle is the same as the quotient of (second unit time/first unit time), and determines that the number of incrementation times of the third count value within the update cycle is not normal when the number of incrementation times of the third count value within the update cycle is not the same as the quotient of (second unit time/first unit time).

For example, as illustrated in FIG. 7, when (second unit time/first unit time)=2, slave device 14 determines that the number of incrementation times of the third count value within the update cycle is normal when the number of incrementation times of the third count value is 2, and determines that the number of incrementation times of the third count value within the update cycle is not normal when the number of incrementation times of the third count value is not 2.

When the number of incrementation times of the third count value within the update cycle of the second count value is normal (Yes in step S20), slave device 14 determines again whether or not the timing is an update timing of the fourth count value (step S13).

When the number of incrementation times of the third count value within the update cycle of the second count value is not normal (No in step S20), slave device 14 generates an alarm (step S21), transmits a transmission request of the first count value to master device 12 (step S22), and determines again whether or not the timing is an update timing of the fourth count value (step S13).

Slave device 14 determines whether or not a time stamp command has been received (step S18), and when the time stamp command has been received (Yes in step S18), determines whether or not the third count value is different from the first count value written in the time stamp command (step S23).

When the third count value is not different from the first count value written in the time stamp command (No in step S23), slave device 14 determines whether or not the second count value has been updated (step S19).

When the third count value is different from the first count value written in the time stamp command (Yes in step S23), slave device 14 generates an alarm (step S24) and corrects the third count value (step S25).

For example, as shown in FIG. 8, when the third count value is 2 and the first count value written in the time stamp command is 3, slave device 14 generates an alarm and corrects the third count value from 2 to 3.

Communication system 10 according to the first exemplary embodiment has been described above.

Communication system 10 according to the first exemplary embodiment includes master device 12 and one or more slave devices 14 that communicate with master device 12. Master device 12 includes: first counter 24 that increments the first count value every time the first unit time elapses; second counter 26 that updates the second count value every time the second unit time elapses; and master transmitter 18 that transmits timing information indicating a timing at which the second count value is updated to each of one or more slave devices 14. Each of one or more slave devices 14 includes: third counter 36 that increments the third count value every time the first unit time elapses; fourth counter 38 that increments the fourth count value every time the third unit time shorter than the first unit time elapses, and resets the fourth count value at a timing at which third counter 36 increments the third count value; and slave receiver 32 that receives the timing information transmitted from master transmitter 18.

According to this, by transmitting not the time information but the timing information indicating the timing at which the second count value is updated to each of one or more slave devices 14, it is possible to suppress deviation of the time information of master device 12 and the time information of slave device 14 while curbing increase in the bandwidth used in a network. The reason why the increase in the bandwidth used in a network can be curbed is that the second count value is one-bit information of 0/1 and is smaller than the data amount related to the time information. In particular, in the notification from master device 12 to slave device 14 in units of nanoseconds, the effect of suppressing the bandwidth used in a network becomes remarkable.

Furthermore, in communication system 10 according to the first exemplary embodiment, each of one or more slave devices 14 further includes determiner 40 and slave transmitter 30. Determiner 40 determines whether or not at least one of the number of incrementation times of the third count value and the number of incrementation times of the fourth count value within the update cycle of the second count value is normal based on the timing information received by slave receiver 32 of slave device 14. When determiner 40 determines that at least one of the number of incrementation times of the third count value and the number of incrementation times of the fourth count value within the update cycle is not normal, slave transmitter 30 transmits a transmission request for the first count value to master device 12. Master device 12 further includes master receiver 20 that receives the transmission request transmitted from slave transmitter 30 of each of one or more slave devices 14. Master transmitter 18 transmits the first count value to slave device 14 that is the transmission source of the transmission request received by master receiver 20 among one or more of slave devices 14.

According to this, transmission and reception of the first count value can be performed only when at least one of the number of incrementation times of the third count value and the number of incrementation times of the fourth count value within the update cycle of the second count value is not normal. Therefore, it is possible to suppress deviation of the time information held by master device 12 and the time information held by slave device 14 while curbing increase in the bandwidth used in a network.

Furthermore, in communication system 10 according to the first exemplary embodiment, the second unit time is an integer multiple of the first unit time.

Accordingly, it is possible to easily determine whether or not the number of incrementation times of the third count value within the update cycle of the second count value is normal.

Furthermore, in communication system 10 according to the first exemplary embodiment, the second unit time is an integer multiple of the third unit time.

Accordingly, it is possible to easily determine whether or not the number of incrementation times of the fourth count value within the update cycle of the second count value is normal.

Furthermore, in communication system 10 according to the first exemplary embodiment, the third unit time is 1/integer times the first unit time.

Accordingly, it becomes easy to ascertain the time information based on the third count value and the fourth count value.

Second Exemplary Embodiment

Figure 9:
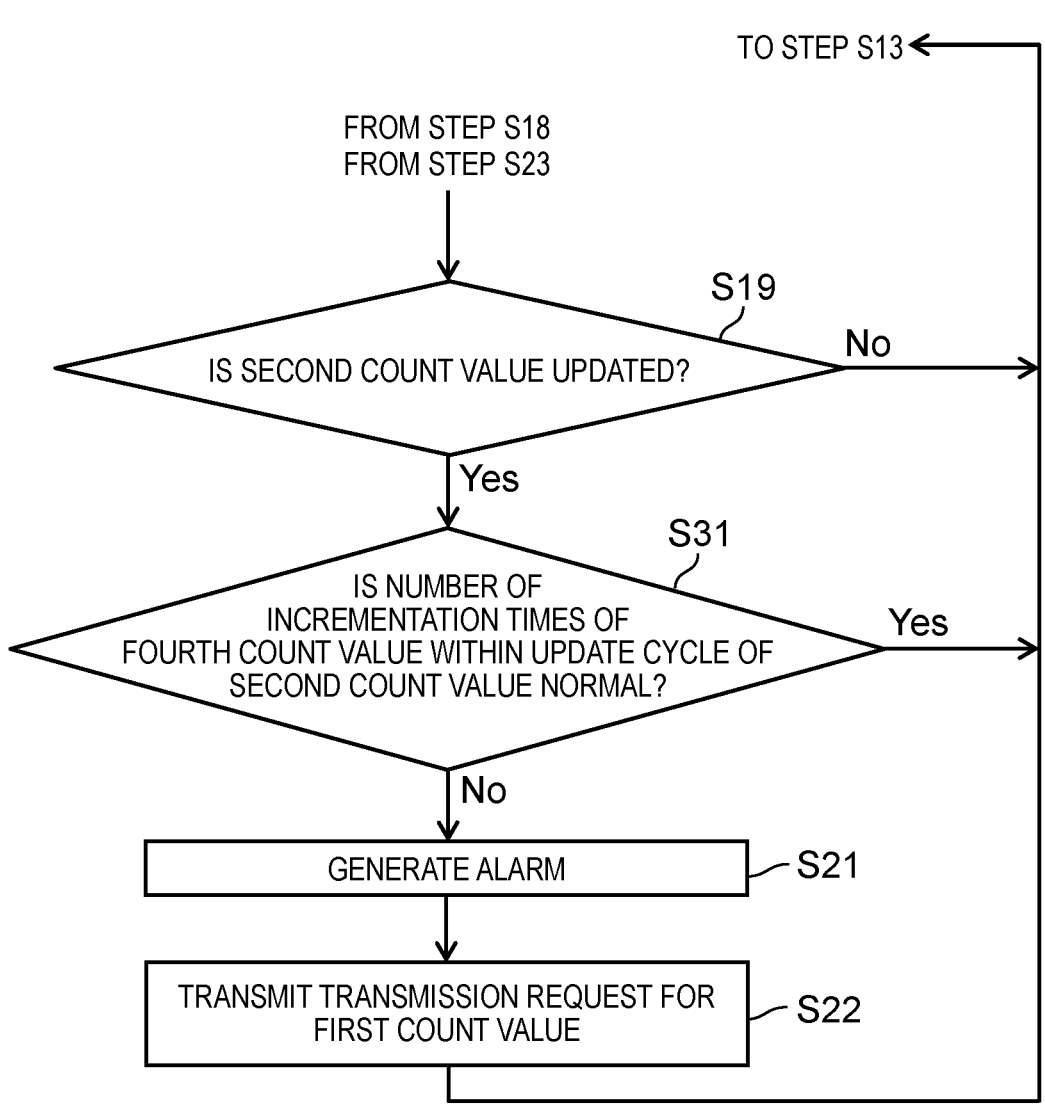
FIG. 9 is a flowchart illustrating an example of an operation of the slave device of the communication system according to a second exemplary embodiment.
Figure 10:
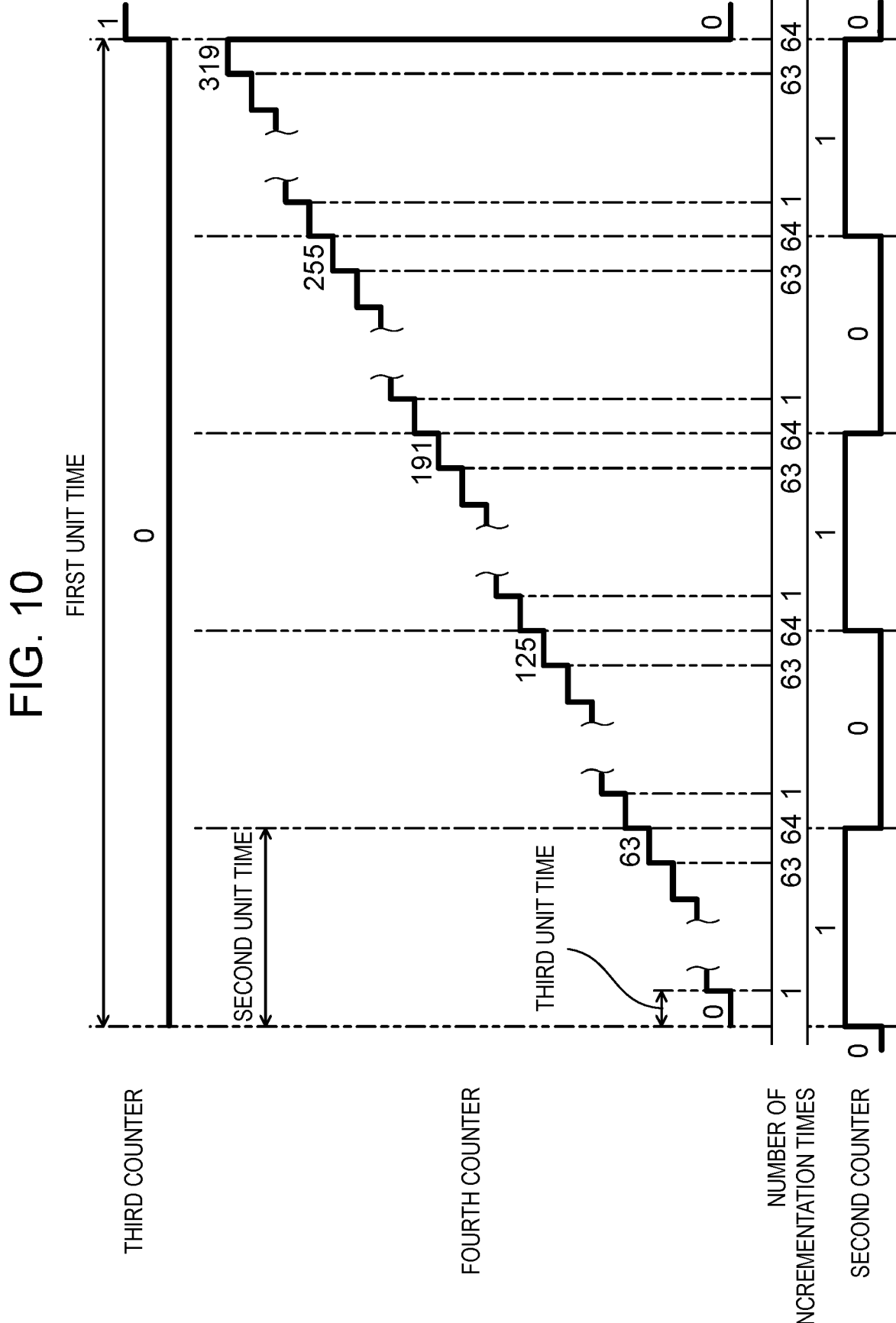
FIG. 10 is a view for explaining an example of an operation of the slave device of the communication system in FIG. 9.

FIG. 9 is a flowchart illustrating an example of an operation of the slave device of the communication system according to a second exemplary embodiment. FIG. 10 is a view for explaining an example of an operation of the slave device of the communication system in FIG. 9. A communication system according to the second exemplary embodiment will be described with reference to FIG. 9 and FIG. 10.

As described in FIG. 9, when the second count value is updated (Yes in step S19), the slave device of the communication system according to second exemplary embodiment determines whether or not the number of incrementation times of the fourth count value within the update cycle of the second count value is normal (step S31). That is, the communication system according to the second exemplary embodiment is different from communication system 10 according to the first exemplary embodiment in determining whether or not the number of incrementation times of the fourth count value, not the number of incrementation times of the third count value within the update cycle of the second count value, is normal.

For example, the slave device of the communication system according to the second exemplary embodiment determines that the number of incrementation times of the fourth count value within the update cycle of the second count value is normal when the number of incrementation times of the fourth count value within the update cycle is the same as the quotient of (second unit time/third unit time), and determines that the number of incrementation times of the fourth count value within the update cycle is not normal when the number of incrementation times of the fourth count value within the update cycle is not the same as the quotient of (second unit time/third unit time).

As illustrated in FIG. 10, in the second exemplary embodiment, the second unit time is shorter than the first unit time and is 1/integer times the first unit time. In the second exemplary embodiment, the second unit time is an integer multiple of the third unit time.

For example, when (second unit time/third unit time)=64, the slave device of the communication system according to the second exemplary embodiment determines that the number of incrementation times of the fourth count value within the update cycle is normal when the number of incrementation times of the fourth count value is 64, and determines that the number of incrementation times of the fourth count value within the update cycle is not normal when the number of incrementation times of the fourth count value is not 64.

The communication system according to the second exemplary embodiment has been described above.

In communication system 10 according to the second exemplary embodiment, the second unit time is shorter than the first unit time.

According to this, even when the second unit time is shorter than the first unit time, by determining whether or not the number of incrementation times of the fourth count value within the update cycle of the second count value is normal, it is possible to suppress deviation of the time information held by master device 12 and the time information held by slave device 14 while curbing increase in the bandwidth used in a network.

Furthermore, in communication system 10 according to the second exemplary embodiment, the second unit time is an integer multiple of the third unit time.

Accordingly, it is possible to easily determine whether or not the number of incrementation times of the fourth count value within the update cycle of the second count value is normal.

Other Exemplary Embodiments

As described above, the exemplary embodiment has been described as an illustration of the techniques disclosed in the present application. However, the techniques according to the present disclosure are not limited thereto, and are also applicable to exemplary embodiments or modification examples in which changes, replacements, additions, omissions, and the like are made as appropriate without departing from the gist of the present disclosure.

In the above-described exemplary embodiment, the case where determiner 40 determines whether or not one of the number of incrementation times of the third count value and the number of incrementation times of the fourth count value within the update cycle of the second count value is normal has been described, but the present invention is not limited thereto. For example, determiner 40 may determine whether or not both of the number of incrementation times of the third count value and the number of incrementation times of the fourth count value within the update cycle of the second count value is normal.

Furthermore, the information transmission path in the above-described exemplary embodiment is an example, and is not particularly limited. In the above-described exemplary embodiment, when two devices transmit and receive information by communication, a relay device (not illustrated) may be interposed between the two devices.

In addition, in the above-described exemplary embodiment, processing executed by a specific processing unit may be executed by another processing unit. Furthermore, the order of a plurality of processing may be changed, or a plurality of processing may be executed in parallel.

In the above-described exemplary embodiment, each constituent element may be realized by executing a software program suitable for each component. A program executor such as a central processing unit (CPU) and a processor reads and executes a software program stored in a recording medium such as a hard disk and a semiconductor memory, and whereby each constituent element may be realized.

In addition, each constituent element may be realized by hardware. For example, each constituent element may be a circuit (or an integrated circuit). These circuits may constitute one circuit as a whole or may be separate circuits. Each of these circuits may be a general-purpose circuit or a dedicated circuit.

In addition, general or specific aspects of the present disclosure may be realized by a system, a device, a method, an integrated circuit, a computer program, or a computer-readable recording medium such as a compact disk-read only memory (CD-ROM).

Moreover, the general or specific aspects of the present disclosure may be realized by any combination of the system, the device, the method, the integrated circuit, the computer program, and the recording medium.

For example, the present disclosure may be realized as a method executed by a computer such as a communication system, or may be realized as a program for causing a computer to execute such a method. The present disclosure may be realized as a computer-readable non-transitory recording medium in which such a program is recorded.

INDUSTRIAL APPLICABILITY

The communication system according to the present disclosure can be used for a communication system or the like including a master device and a slave device.

REFERENCE MARKS IN THE DRAWINGS

10 communication system
12 master device
14 slave device

15

16 master controller
18 master transmitter
20 master receiver
22 master storage
24 first counter
26 second counter
28 slave controller
30 slave transmitter
32 slave receiver
34 slave storage
36 third counter
38 fourth counter
40 determiner
C12, C14 internal clock

The invention claimed is:

1. A communication system comprising:
a master device; and
at least one slave device that communicates with the master device,
wherein the master device includes;
a first counter that increments a first count value every time a first unit time elapses,
a second counter that updates a second count value every time a second unit time elapses, and
a master transmitter that transmits timing information indicating a timing at which the second count value is updated to the at least one slave device, and
the at least one slave device including;
a third counter that increments a third count value every time the first unit time elapses,
a fourth counter that increments a fourth count value every time a third unit time shorter than the first unit time elapses, and resets the fourth count value at a timing at which the third counter increments the third count value, and
a slave receiver that receives the timing information transmitted from the master transmitter.

2. The communication system according to claim 1, wherein
the at least one slave device further including:
a determiner that determines whether or not at least one of the number of incrementation times of the third count value and the number of incrementation times of the fourth count value within an update cycle of the second count value is normal based on the timing information received by the slave receiver, and
a slave transmitter that transmits a transmission request for the first count value to the master device when the determiner determines that at least one of the number of incrementation times of the third count value and the number of incrementation times of the fourth count value within the update cycle is not normal,
the master device further includes:
a master receiver that receives the transmission request transmitted from the slave transmitter of the at least one slave device, and
the master transmitter transmits the first count value to a slave device that is a transmission source of the transmission request received by the master receiver.

3. The communication system according to claim 1, wherein the second unit time is an integer multiple of the first unit time.

4. The communication system according to claim 1, wherein the second unit time is shorter than the first unit time.

5. The communication system according to claim 1, wherein the second unit time is an integer multiple of the third unit time.

6. The communication system according to claim 1, wherein the third unit time is 1/integer times the first unit time.

7. A master device comprising:
a first counter that increments a first count value every time a first unit time elapses;
a second counter that updates a second count value every time a second unit time elapses; and
a master transmitter that transmits timing information indicating a timing at which the second count value is updated to at least one slave device that communicates with the master device.

8. A slave device that communicates with a master device, wherein
the master device includes a first counter that increments a first count value every time a first unit time elapses, a second counter that updates a second count value every time a second unit time elapses, and a master transmitter that transmits timing information indicating a timing at which the second count value is updated to the slave device, and
the slave device comprises:
a third counter that increments a third count value every time the first unit time elapses;
a fourth counter that increments a fourth count value every time a third unit time shorter than the first unit time elapses, and resets the fourth count value at a timing at which the third counter increments the third count value; and
a slave receiver that receives the timing information transmitted from the master transmitter.

9. A control method for a communication system including a master device, and at least one slave device that communicates with the master device, the method comprising:
by the master device,
incrementing a first count value every time a first unit time elapses;
updating a second count value every time a second unit time elapses; and
transmitting timing information indicating a timing at which the second count value is updated to the at least one slave device, and
by the at least one slave device,
incrementing a third count value every time the first unit time elapses;
incrementing a fourth count value every time a third unit time shorter than the first unit time elapses, and resetting the fourth count value at a timing of incrementing the third count value; and
receiving the timing information transmitted from the master device.

* * * * *